Oct. 28, 1924.

B. HOUGHTALING

SIGNAL

Filed Feb. 14, 1923

R. A. Thomas

Barney Houghtaling  INVENTOR

BY Victor J. Evans

ATTORNEY

WITNESSES

Oct. 28, 1924.
B. HOUGHTALING
SIGNAL
Filed Feb. 14, 1923
1,513,509
2 Sheets-Sheet 2
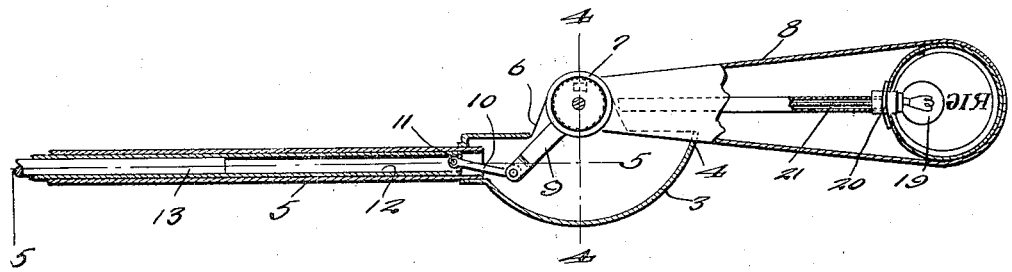
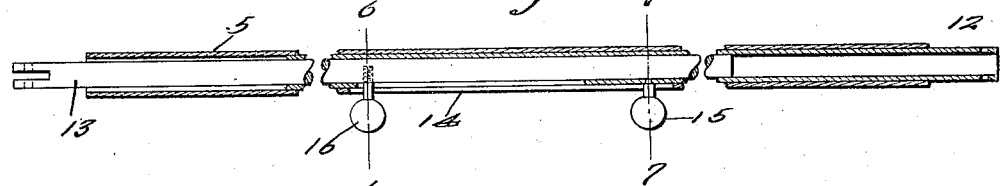
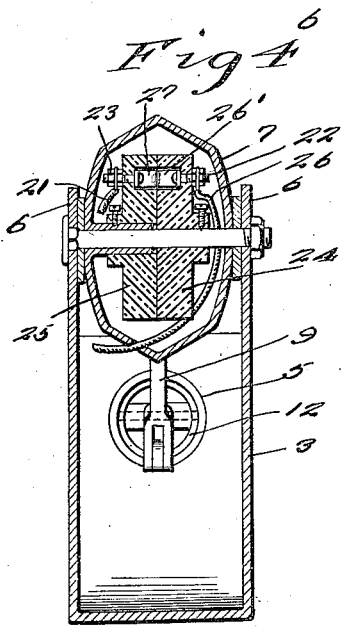
Barney Houghtaling INVENTOR
BY Victor J. Evans ATTORNEY
WITNESSES Patented Oct. 28, 1924.

1,513,509

UNITED STATES PATENT OFFICE.

BARNEY HOUGHTALING, OF MADISON, WISCONSIN.

SIGNAL.

Application filed February 14, 1923. Serial No. 618,962.

*To all whom it may concern:*

Be it known that I, BARNEY HOUGHTALING, a citizen of the United States, residing at Madison, in the county of Dane and State of Wisconsin, have invented new and useful Improvements in Signals, of which the following is a specification.

My present invention has reference to a direction signal for vehicles.

My object is to arrange on the sides of the windshield of an automobile or on the front of other vehicles signal arms normally sustained in a vertical position but susceptible to independent swing to outward angles whereby vehicles to the front or rear of that carrying the signals will have knowledge of the course to be taken by the machine, and thereby avoid accidents which frequently occur when a vehicle is making a turn.

A further object is to produce a device of this character which shall be of a simple nature, easily operated from the driver's seat and which shall be positive in action.

A still further object is to produce a direction signal of the class set forth in which the signal arms carry illuminating means which are designed to be lighted when the arms are turned to signalling position so that the device may be successfully employed in both day and night time.

To the attainment of the foregoing and other objects which will present themselves as the nature of the invention is better understood, reference is to be had to the drawings which accompany and which form part of this application.

In the drawings:—

Figure 3 is a sectional view on the line 3—3 of Figure 2.

Figure 4 is a sectional view on the line 4—4 of Figure 3.

Figure 5 is a greatly enlarged sectional view approximately on the line 5—5 of Figure 3.

Figure 8 is an elevation of one of the elements embodied in the invention; and Figure 9 is a vertical sectional view taken on line 9—9 of Figure 1.

Figure 1:
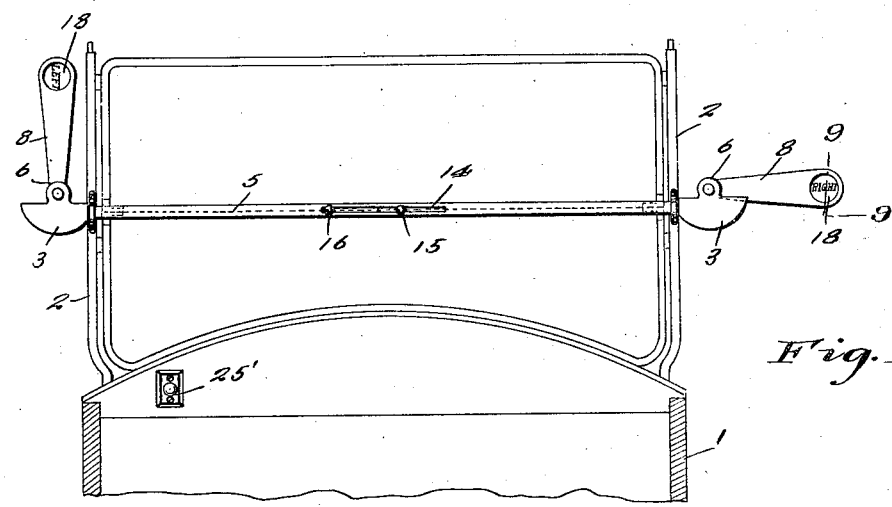
Figure 1 is a front elevation of an automobile equipped with my direction signal.
Figure 6:
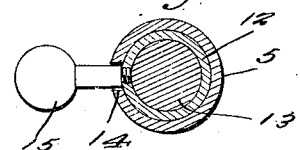
Figure 6 is a similar sectional view approximately on the line 6—6 of Figure 5.
Figure 7:
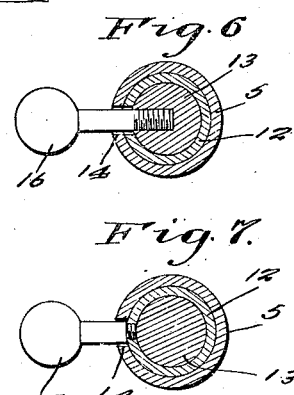
Figure 7 is a sectional view taken on line 7—7 of Figure 5.
Figure 2:
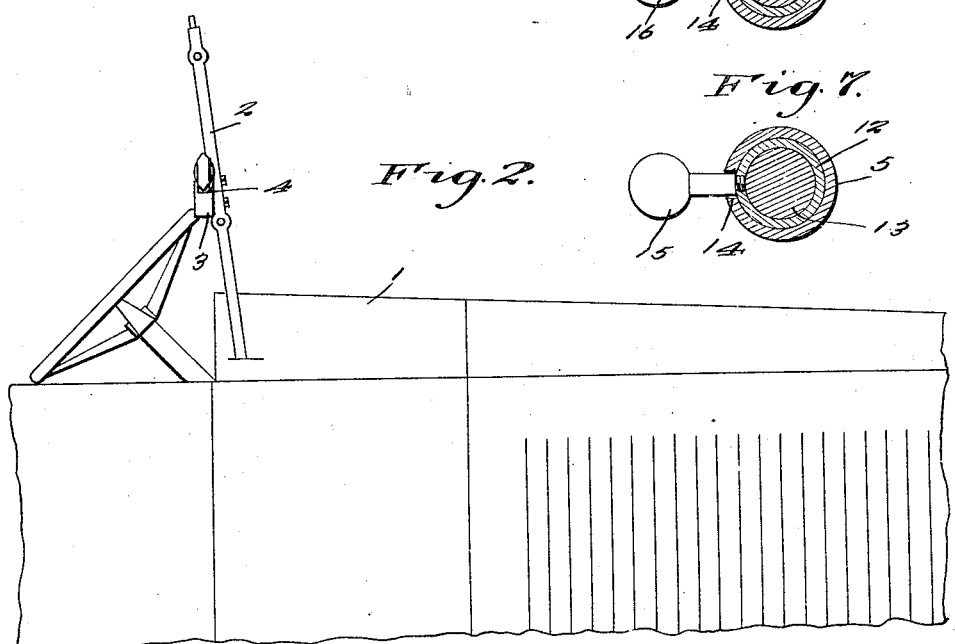
Figure 2 is a side elevation thereof.

As disclosed by the drawings I make use of two signal arms, one arranged on each side of the windshield of the automobile 1. The signal arms are alike in all particulars, and therefore a detailed description of one will be taken as equally applicable to the other.

Secured to the sides of the windshield frame 2 of the automobile, at the center thereof, that is in a line centrally with respect to the upper and lower windshield frames, I secure casings 3. Each of the casings is in the nature of a metal member having its top open and rounded downwardly from its outer to its inner end, the outer edge of the said rounded portion being formed with a slot or depression 4. The casings have their inner ends connected to a metal tube 5 secured in any desired or preferred manner on the windshield frame so that the same is retained rigidly thereon.

Each casing has its flat sides provided with upwardly extending portions in the nature of spaced brackets 6, and between these brackets there is pivoted the inner rounded end 7 of a signal arm 8.

To the lower edge of the end 7 of the arm 8 there is secured an inwardly directed arm 9 pivotally connected with a link 10. The links 10 for the respective signal arms are pivoted as at 11, one to a tubular rod 12 and the other to a solid rod 13 that is telescopically received in the tubular rod 12. Both of these rods are arranged in the fixed tube 5, the latter being approximately centrally provided with an elongated cut-away portion or slot 14 through which project knobs or handles 15 and 16 respectively of the tubular rod 12 and the solid rod 13. The knobs or handles 15 and 16 are arranged to one side of the steering wheel of the machine so that the driver can grasp either of the said knobs to move either of the rods longitudinally to cause the signal arms to be moved from a vertical to an angle or to an outward horizontal position with respect to the vehicle.

Each signal arm has its outer end rounded and is provided with a rounded opening, the inner wall of which being provided with a continuous substantially V-shaped groove to receive therein the V-shaped outer periphery of a metal ring 17 that forms a frame for concavo-convex lens 18, and in the casing provided by the lens there is an electric lamp bulb 19. The bulb is screwed in a suitable socket 20 in the arm 8, and the said arm 8 is centrally formed with a tubular passage for the wires 21 for the lamp bulb 19.

The wires 21 lead respectively to binding posts 22 and 23 secured on disks 24 and 25 of insulating material, one of the disks being rigidly secured to one of the brackets 6 and being arranged in a rounded pocket at the pivoted end of the arm 21, the second disk being fixed to the said arm. To the posts 22 and 23 there are secured conductor wires 25 and 26 respectively, the same communicating with the electric source of the automobile and being controlled by switches 25. Each of the disks has flexibly connected to the biding posts thereon spring influenced contact members 26 and 27 respectively, the contact member 26 on the fixed disk being arranged outwardly and in a longitudinal plane with the pivot for the signal arms.

The contacts 26 and 27 may, of course, be otherwise positioned, and one of the contacts may be in the nature of a spring ring or a split spring ring, in the former instance, the bulb will be illuminated when the signal is in any of its positions, and the latter will be employed when the signal is to be thrown outwardly to an angle of approximately 45° and from thence to a horizontal position.

The improvement may be easily installed upon any ordinary automobile or similar vehicle, comprises few simple parts, is easy and positive in operation. Suitable means, such as a spring ratchet may be employed to engage the periphery of the inner rounded end of the signal arms to assist in holding the said arms at desired position, and it is thought that the foregoing description, when taken in connection with the drawings will fully set forth the construction and advantages of the improvement to those skilled in the art to which such inventions relate.

Having described the invention, I claim:

Oppositely arranged semi-circular casings having open tops and partly open outer sides, and a slotted tubular member connecting the casings, a signal arm pivotally supported in each of the casings and normally arranged in a vertical plane, an arm depending therefrom, and disposed in the casings, a link connected thereto, rods connected to the links, one of said rods being hollow and telescopically receiving the other rod, and both rods being arranged in the tubular connecting member for the casing, and operating knobs on the respective rods arranged in the slotted portion of the tube, the casings serving to limit the pivotal movement of the arms in one direction and support the latter in operative position.

In testimony whereof I affix my signature.

BARNEY HOUGHTALING.